United States Patent [19]

Prame

[11] Patent Number: 4,592,013
[45] Date of Patent: May 27, 1986

[54] METHOD AND DEVICE FOR ADDRESSING A MEMORY

[75] Inventor: Eric S. Prame, Lidingo, Sweden

[73] Assignee: International Business Machines Corp., Armonk, N.Y.

[21] Appl. No.: 409,004

[22] Filed: Aug. 17, 1982

[30] Foreign Application Priority Data

Aug. 21, 1981 [SE] Sweden ............................ 81049819

[51] Int. Cl.⁴ .............................................. G06F 9/36
[52] U.S. Cl. ................................................... 364/900
[58] Field of Search ........ 364/200, 900, 200 MS File, 364/900 MS File

[56] References Cited

U.S. PATENT DOCUMENTS

| | | | |
|---|---|---|---|
| 3,739,532 | 6/1973 | Packard | 364/200 |
| 4,318,175 | 3/1982 | Hawley | 364/200 |
| 4,356,549 | 10/1982 | Chueh | 364/200 |
| 4,385,352 | 5/1983 | Bienvenu | 364/200 |
| 4,419,727 | 12/1983 | Holtey et al. | 364/200 |
| 4,432,053 | 2/1984 | Gaither et al. | 364/200 |
| 4,447,879 | 5/1984 | Fong | 364/200 |
| 4,453,212 | 6/1984 | Gaither et al. | 364/200 |

Primary Examiner—Gareth D. Shaw
Assistant Examiner—Kevin A. Kriess
Attorney, Agent, or Firm—Robert W. Berray

[57] ABSTRACT

An address word (N) for addressing a memory (2) comprises an exponent field (P) that defines on one hand the number of basic data units or accesses to be made to a memory, on the other a number by which a second field (M) in the address word is modified, the memory initially being addressed by the modified second field.

4 Claims, 5 Drawing Figures

METHOD AND DEVICE FOR ADDRESSING A MEMORY

BACKGROUND OF THE INVENTION

1. Field of the Invention

This invention relates to a method and a device for addressing a memory and more particularly to a method including the arithmetic modification of one part of a memory address in accordance with a value specified by a second part of the address.

2. Prior Art

Within memory access techniques there is a need to use address words of suitable size in order to have access to suitably sized memory data fields. Sometimes it is convenient to address just a small data field, other times a large one. According to "Electronic Digital Systems" by R. K. Richards, published in 1966 by John V. Lay et Sons, pages 135 and 136, it is known to use an address word, where a given part of the address specifies the quantity of memory data, to which access is made by the addressing.

The problem of this method of addressing is that the data quantity defining part of the address grows too large, if varying data fields are to be addressed. If, for instance, it is desirable to use address words of constant length, the active address part will be small in the address word, if the data defining part becomes large.

One embodiment of the above mentioned known addressing system is shown in U.S. Pat. No. 4,126,897, inventor: Capowski et al, wherein an address word of constant length marking bits are used in order to obtain access to single-, double-, square- or N-words.

In IBM Technical Disclosure Bulletin, Vol. 18, No. 7, December 1975 there is described on page 2234 an addressing system, where 24 as well as 32 bits address words are used, these addresses being distinguished by a marking bit. The disadvantage of using address words of varying length is the fact that the architectural construction of the system becomes considerably more complicated.

SUMMARY OF INVENTION

This invention solves the above mentioned problem of prior art systems as well as the problem of addressing not only very large data quantities but also very small ones within a system that is architecturally not complicated, by the use of arithmetic modification of part of an address under control of another part of the address.

The advantage of the addressing system according to this invention is the possibility to address nearly unlimited data quantities simultaneously with addressing very small data quantities without making the system architecture complicated.

Another advantage of this invention is that addressing a large data memory implies the use of data units having comparatively numerous information bits, while the addressing of a small data memory implies the use of data units having comparatively few information bits.

Still another advantage of this invention, in which an "exponential" method of addressing is used, is that there is no need to employ marking bits; the exponential part of the address word defines directly the size of the basic data unit in terms of number of bits. A further advantage of the invention is that the same addressing system can be used in very large systems having large data quantities and in very small systems, where data units having sizes down to one bit selectively are addressed.

BRIEF DESCRIPTION OF DRAWINGS

The detailed description of the invention will now be given in conjunction with the accompanying drawings.

DETAILED DESCRIPTION OF INVENTION

In today's data systems it is possible to address only a limited quantity of data. An address field having N bits can thus address up to $2^N$ data units that are normally defined as bytes. Up to now it has been quite common in large computer systems to use address words having 24 bits, but such systems are getting too limited. On the other hand a high price has to be paid if the use of a new addressing concept in form of an "exponential" or "floating" method of addressing. An address word having a constant number of bits is used, and it is still possible to address nearly an unlimited number of data.

Figure 1:
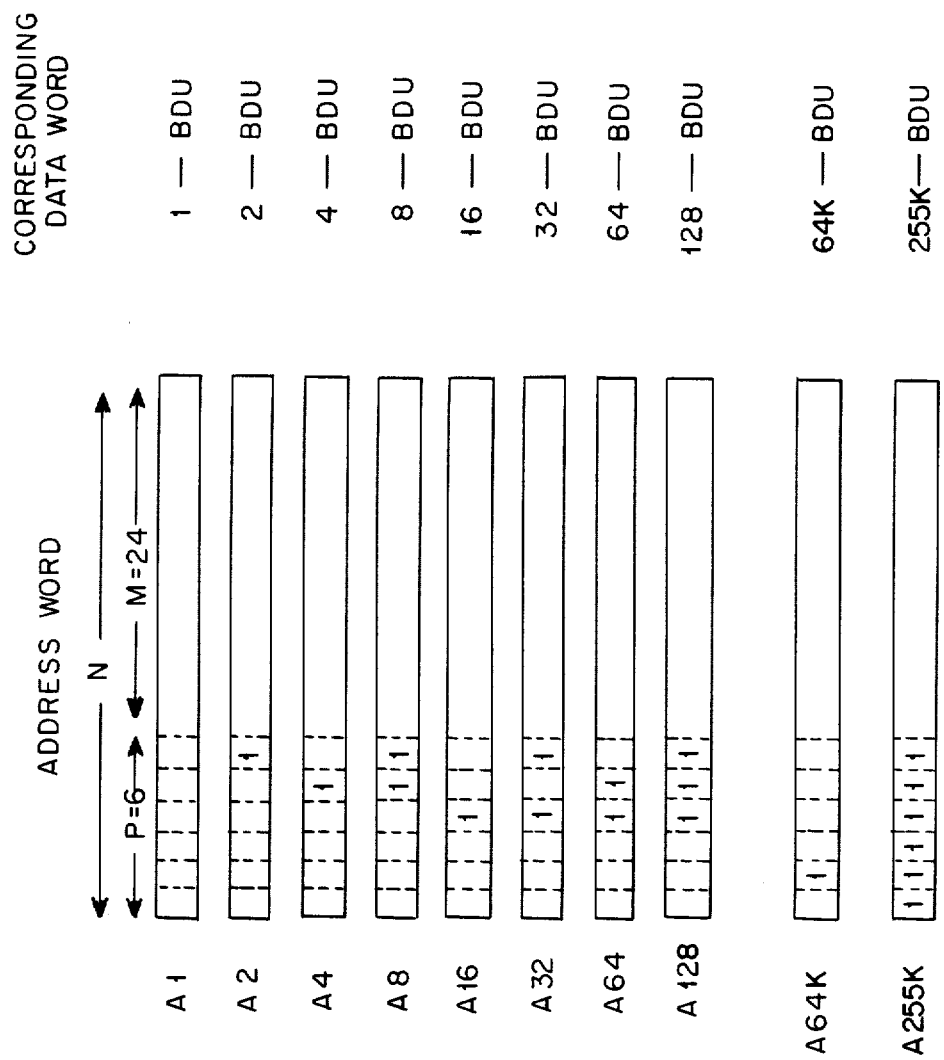
FIG. 1 illustrates address words and data words according to a first embodiment of the invention.

FIG. 1 shows an example of a plurality of address words and the size of the corresponding data words according to this invention. In this example it has been supposed that the effective address field M of the address word contains 24 bits. It has further been supposed that the exponent field P of the address word contains 6 bits, which means that the complete address word N comprises an address field having 30 bits.

The first address word A1 has only zeroes in the exponent-field P. This means that the corresponding data word is defined as $2^p = 2^0 = 1$ BDU, where p is the digital content of P and where BDU defines a basic data unit. A basic data unit can be a bit, a byte having 8 bits or whatever combination of bytes. Thus, the address word A1 always addresses data words consisting of only one basic data unit.

The address word A2 has a one in the first position of the P-field. This means that the address word A2 addresses data words having $2^1 = 2$ BDU.

The address word A4 has a one in position 2 of the P-field. This means that the address word A4 addresses data words having the size $2^2 = 4$ BDU. The address word A8 has further a one in the positions 1 and 2 of the P-field. Thus, the address word A8 works with data words of the size of $2^3 = 8$ BDU.

In the same way the address word A16 addresses data words consisting of 16 basic data units and the address word A32 addresses data words consisting of 32 basic data units and so on up to the address word A255K that addresses 255K BDU (K = 1024).

In the above example, p goes from 0 to 63 and a scaling factor S, defined as $2^p$ BDU, goes from $2^0$ to $2^{63}$ BDU bits. If BDU for the sake of simplicity is supposed to be 1 bit, the scaling factor will be $2^p$ bits. The memory field U being addressed is supposed to be $f \times 5$ bits. For the sake of simplicity, f is supposed to be $f = 1$, and then U will be $S = 2^p$ bits. If m is the digital content of M, then the address A of a memory field will be $m \times s$. The maximum amount of data D that can be addressed with such an address field is then:

$$D = 2^M \times S_{max} = 2^M \times 2^{p_{max}} = 2^M \times 2^{(2^8-1)} = 2^{24} \times 2^{(2^6-1)} = 2^{87} \text{ bits.}$$

Assuming on the other hand an address field having 30 bits that in the usual way addresses bytes comprising 8 bits, the maximum addressable data range will be:

$$D = 2^{30} \text{ bytes} = 2^{33} \text{ bits} = 10^{10} \text{ bits.}$$

Figure 2:
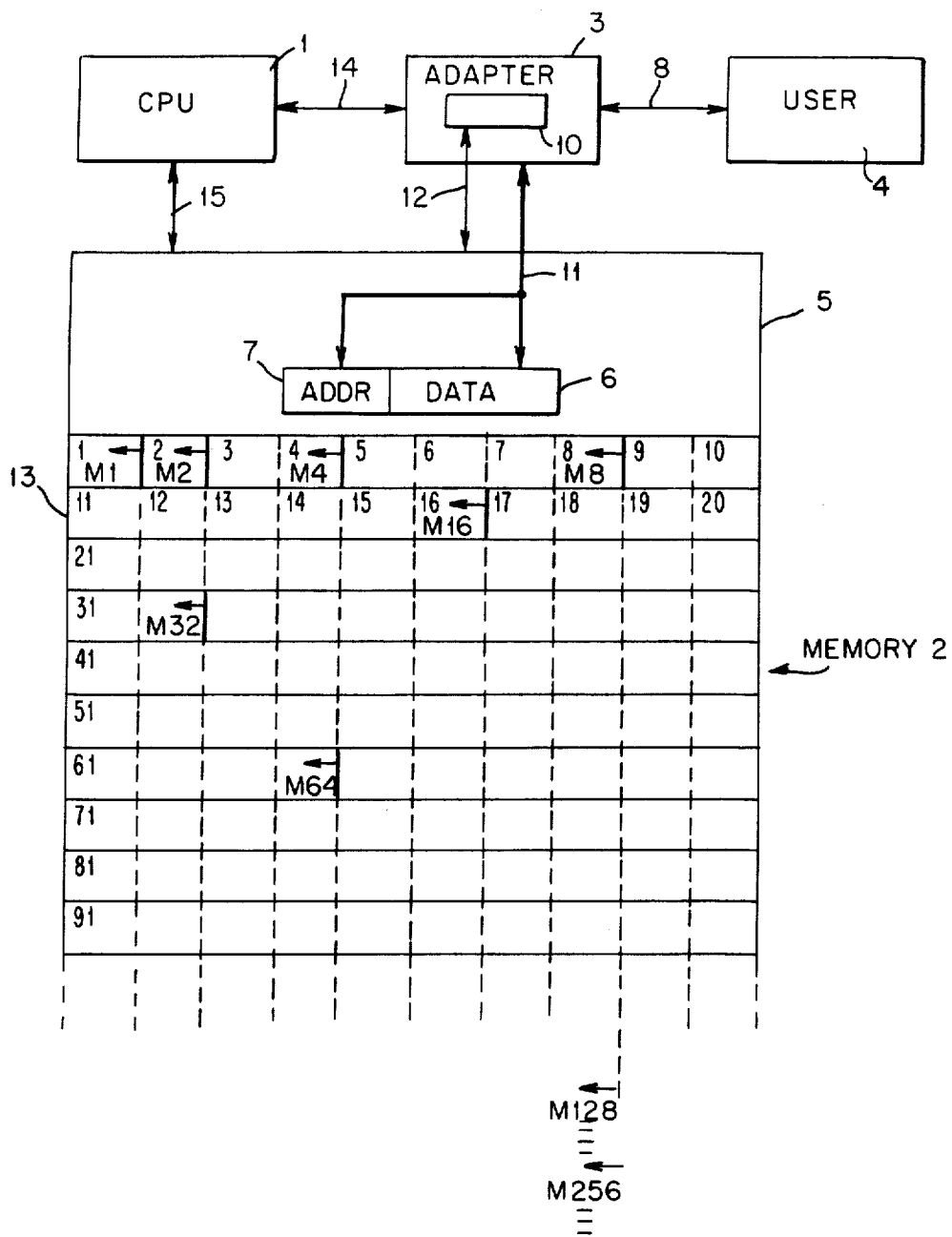
FIG. 2 illustrates a memory addressing system according to the invention.

FIG. 2 is a schematic illustration of a data system containing a central processing unit (CPU) 1, an adapter unit 3, a memory 2 and a user unit 4. The memory 2 comprises a control unit 5 having an address register 7 and a data register 6. The memory 2 further contains a number of memory modules 13. The adapter unit 3 comprises an adapter control unit 10. The adapter 3 is further connected to the user unit 4 over a transfer channel 8 and to the memory control unit 5 over an input/output bus 11. The adapter control unit 10 is connected to the memory control unit 5 over a connection 12. The CPU unit 1 that may consist of a host engine is connected to the adapter unit 3 over a channel 14 and to the memory control unit 5 over a channel connection 15. The transfer bus 11 from the adapter unit 3 is connected to the data register 6 as well as to the address register 7 of the memory control unit 5.

Each of the memory modules 13, for example memory module number 11 referenced by 13 in FIG. 2, would typically be a memory chip comprised of 128K (K = 1,024) addressable locations. The memory chip would provide a single bit output in response to an address that identifies a particular one of the 128K locations. Depending on the system being designed, the memory 2 might typically be comprised of 64 128K × 1 memory chips to thereby provide a 64-bit data word when memory 2 is addressed.

The memory 2 consists of a number of submemories M1, M2, M4, M8, M16 ... The submemory M1 consists of only one memory module 13. The submemory M2 consists of two memory modules 13 and contains all the submemory M1. Correspondingly, the submemory M4 comprises four memory modules and includes both M1 and M2. The submemory M8 further consists of eight memory modules, and the submemory M1, M2 and M4 and so on are also included.

An address word A1 according to FIG. 1 can only address memory positions of the submemory M1. Correspondingly an address word A2 can only address memory positions of submemory M2 and so on.

The function of the system shown in FIG. 2 will now be described in connection with the address words and data words of FIG. 1.

Suppose that the basic data unit (BDU) of memory 2 is one bit. Further suppose that the user 4 wishes to store a data bit into a memory position of memory module 1 of memory 2, that is the submemory M1. The user then sends an address word A1 having the current memory position address in the part M of the address word over the transfer channel 8 to the adapter 3. At the same time the data word having the bit in question is also sent to the adapter 3. From the adapter 3 the address and the data word are transferred over the transfer channel 11 to the memory 2, that is the address to the address register 7 and the data word to the data register 6. The address register 7 then addresses the memory position of the memory module 1 and stores the data bit into that position from the data register 6.

It is now assumed that the user 4 wants to fetch a data byte having eight bits from the memory module 5 of the submemory M8 of the memory 2. Then the user sends an address word A8 having the current address multiplicator in its field M over the transfer channel 8 to the adapter 3 and further on from the adapter 3 over the transfer channel 11 to the address register 7. The correct address residing in the address register 7, the position in question of the memory module 5 will then be addressed, and a data word having 8 bits will be fetched therefrom and loaded into the data register 6. Thereafter the data word is transferred from the data register 6 over the channel 11 and the adapter 3 to the user unit 4.

From the above it can be seen that the user 4 is able to access all the memory positions of the memory module 1 comprising the submemory M1. By means of the address word A2 the user is able to address every second memory position of the memory modules 1 and 2, comprising the submemory M2. He may then address the positions 0, 2, 4, 6 and so on. Using the address word A4 the user is able to address every fourth memory position of the memory modules 1, 2, 3 and 4, that is of the submemory M4. He is then able to address the positions 0, 4, 8, 12 and so on. Since the length of the data word for the address word A4 is four bits, access can be made to all the positions of the submemory M4. The same is true for all other large submemories.

From the above it can be seen that the exponential addressing system according to the invention makes it possible to separate a memory into a hierarchically increasing submemory system having increasing addressing accuracy towards the smaller submemories and having increasing data accessing possibility towards the large submemories. That is, addressing to the bit level for M1 to large amounts of data for each access with larger submemories.

Figure 3:
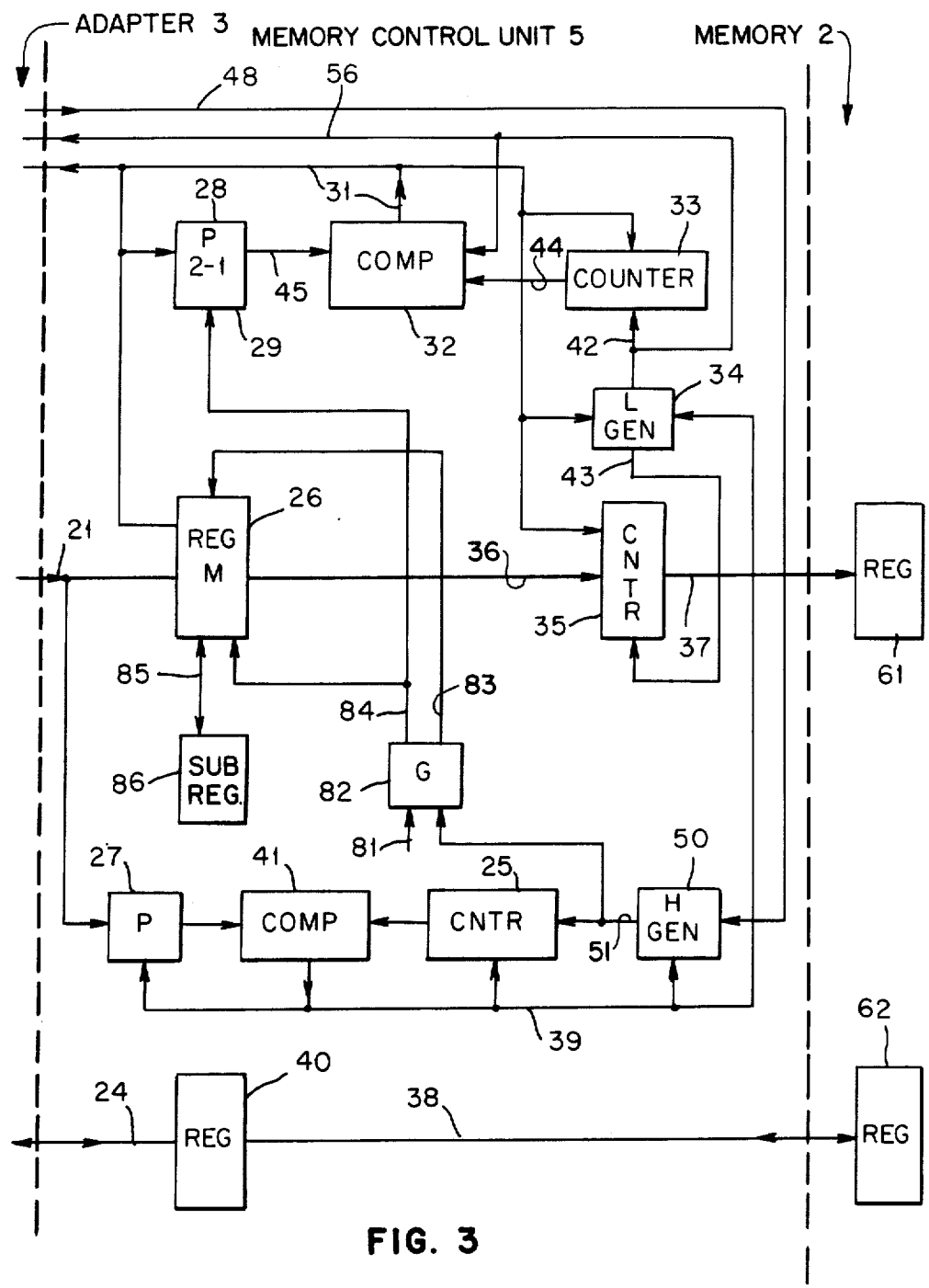
FIG. 3 illustrates a memory control unit that is embodied in the system of FIG. 2.

A more specific embodiment of the invention will now be described in connection with FIG. 3 showing in more detail the construction of the memory control unit 5. According to FIG. 3 the control unit 5 includes a M register 26 for the M part of the address word and a P register 27 for the P part of the address word. The control unit 5 further includes a buffer data register 40 being connected to the adapter 3 over a data channel 24. The registers 26 and 27 are connected to the adapter 3 by means of an address channel 21.

It is supposed that the user is going to store a data word by means of an address word A8 into the memory 2. The address A8 is then inserted over the address channel 21 into the registers 26 and 27, the M part being inserted into the register 26 and the P part into the register 27. The adapter 3 delivers a control signal on a line 48 to a H generator 50 of high speed operation. The H generator 50 starts emitting output pulses on its output line 51. These pulses are inserted into a counter 25 as well as over a gate 82 and a line 84 into the register 26 and to a further register 28 operating as a $2^p-1$ register. The output of the counter 25 is connected to a comparator 41, the second input of which is connected to the output of the register 27. When the counter 25 has counted three steps, that is when the generator 50 has delivered three pulses, the comparator 41 will indicate equal. This depends upon the P register 27 having stored a value three, when a A8 address word is used with a digit 3 in its P field according to FIG. 1.

When the comparator 41 detects the same value on its both inputs, it delivers a reset output signal on its output line 39 to the register 27, the counter 25 and the generator 50 that are then reset. This means that the H generator 50 does not emit output pulses any more. The three signals that have been emitted by the H generator 50 are used in the register 26 as shift pulses in order to shift the M part three times upwards. In the register 28, on the other hand, the pulses from the generator 50 are used as input pulses, which means that three bits are shifted into register 28, whereafter this register will store the value of 7.

From FIG. 1, it is seen that the size of the data word for an A8 address word is eight basic data units, where a basic data unit may be a byte or whatever data quantity. Now the first basic data unit of all eight basic data units is transferred over data channel 24 to the register 40 for intermediate storing. From the register 40 this basic data unit is transferred over a transfer channel 38 to the data register 62 of memory 2. At the same time the contents of register 26 that have been shifted upwards are transferred over a channel 36 to a counter 35 and further on over an output channel 37 to the address register 61 of the memory 2. The address register 61 then addresses the memory and the first basic data unit is stored in this position of the memory from the data register 62.

When the comparator 41 delivers an output signal on its output line 39, this signal also initiates a low speed generator 34. This L-generator 34 emits pulses of a frequency consistent with the access time of memory 2 over its output 43 to the counter 35 as well as over its output 42 to a further counter 33.

When the generator 34 emits a pulse to the counter 35, this counter will be incremented by one. At the same time the counter 33 is incremented by one, a synchronizing pulse is delivered on a line 56 to the adapter 3 requesting a new basic data unit to be transferred to the register 40 and further on to the data register 62. The updated address in the counter 35 is transferred to the address register 61, whereafter the second basic data unit is stored in the memory 2 in a higher memory position as compared to the first basic data unit.

In this way the address in the counter 35 is shifted upwards one step for every new basic data unit that is transferred from the adapter to the data register 62 in order for the address in the address register 61 to be shifted upwards accordingly.

The counter 33 has an output 44 to a further comparator 32, the second input of which being the output 45 from the register 28. When the counter 33 reaches the value of seven, the comparator 32 will detect an equal value on its both inputs. This takes place at the time when all eight basic data units have been stored in memory 2, which means that the storing cycle will be terminated. The comparator 32 then emits an output signal on its output line 31 with resulting reset of the registers 28 and 26 and of the counters 33 and 35. Further, the low speed generator 34 is stopped.

When data is to be fetched from memory 2 and transferred over the adapter 3 to the user 4, the data stream has the opposite direction. The basic data units are transferred one at the time over the register 62 and the transfer channel 38 to the register 40 and from there over the data channel 24 to the adapter 3. The addressing by means of the register 26, the counter 35 and the address register 61 is, however, handled in the same way as in the previous example.

When access to the memory 2 is wanted by means of another address word according to FIG. 1, the addressing of the memory takes place in approximately the same way as has been shown in connection with the address word A8. The only difference is that the P field of the address word has another value, this other value being stored in the register 27 and the registers 26 and 28 being shifted by the corresponding P value. The data access to memory 2 will then take place step by step until the comparator 32 indicates that all the basic data units for a data word have been transferred.

It should be noted that further modifications can be made in circuits according to FIG. 3 and FIG. 2 without departing from the scope of the invention. Thus, it is possible to use one signal input channel for address and data words, address and data being discriminated by marking bits that influence channel gates in the same way as explained in the above U.S. Pat. No. 4,126,897. Further, it is possible to use double input data registers in order to increase the transfer speed and also specific marking bits in order to attain memory storing in progressive as well as declining order of address. However, one important change has then to be done in the circuits according to FIG. 3: declining addressing requires that the counter 33 during the first operation cycle is loaded with the complete updating value $2^p - 1$ and thereafter is stepped downwards by the value of one for each operation cycle.

The detailed construction of the adapter 3 indicated in FIG. 2 is no important part of the present invention. However, it preferably corresponds to a design disclosed in the U.S. Pat. No. 4,110,830, inventor: M. A. Krygowski. The sequence generators 35 and 50 are then preferably located in the adapter unit 3 rather than in the control unit 5.

To a man skilled in the art it is obvious that the circuit according to FIG. 3 as well can be built having a register 28 that stores the value of $2^p$ rather than $2^p - 1$. What is important is that the comparator 32 and the counter 33 are synchronized to the data transfer in the data registers 40 and 62 in order that the correct number of data words, that is $2^p$ data words are transferred for every address word. A $2^p$ register is a shift register, where a one is shifted p steps upwards from the first position.

The system described above according to FIG. 2 and FIG. 3 could be difficult to use in such a case when the basic data unit in use is small, for example, one bit or a few bits, but the memory space of the memory 2 is large. When access is made to the memory using address words having high values in the P field, for instance address words A128 and higher values, a very great number of accesses to the memory 2 are needed for every address word. If it is desirable to reduce the number of memory accesses by increasing the number of bits in a basic data unit, the addressing accuracy will decrease correspondingly.

Figure 4:
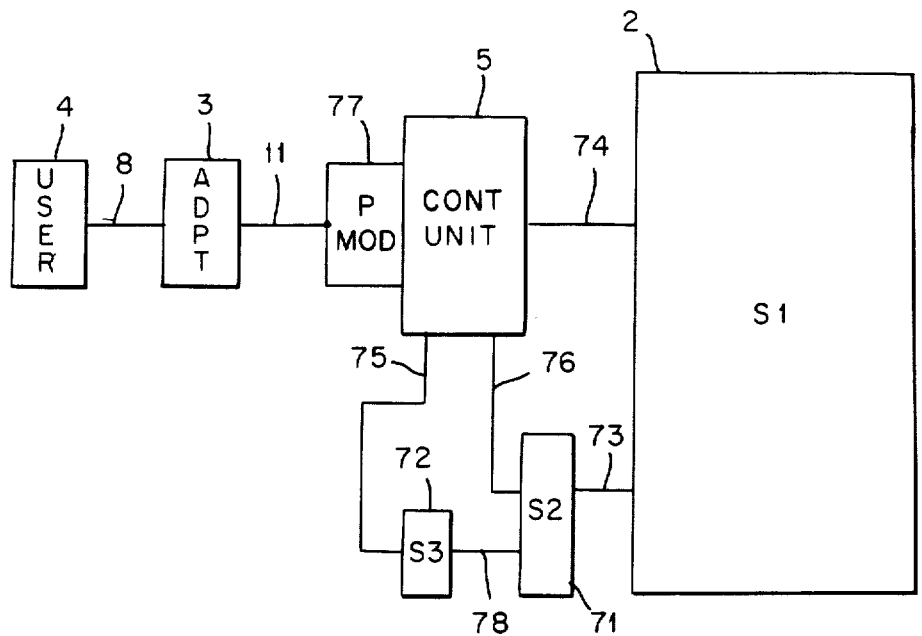
FIG. 4 illustrates a modified system according to the invention.

FIG. 4 illustrates a modified system according to the invention that will solve the above mentioned problem. Besides the memory 2, here referenced as main memory S1, a first submemory S2 having the reference 71 and a second submemory S3 having the reference 72 are used. Further, the memory control unit 5 has been enlarged by means of a P modifier circuit 77.

From the user point of view the very best way to make use of the invention is to let the P field of the address word directly indicate the data word length in bits, that is that the basic data unit is one bit. The system according to FIG. 4 is built in such a way that the memory for the user unit 4 is transparent in such a way that access to the memory can be made by various types of address words, and still access time does not vary unreasonably. This is realized by giving each memory S1–S3 its own P modifier in the unit 77. The task of the P modifiers is to indicate the basic data unit length for the various memories. Thus, the basic data unit has the biggest size for the memory S1, the smaller size for the submemory S2 and the smallest size for the submemory S3.

The function of the system according to FIG. 4 will now be described in connection with an example where the P modifier for memory S1 is p1=10, for S2 is p2=5 and for S3 is p3=0. This means that the basic data unit for memory S1 is equal to $2^{p1}=2^{10}=1024$ bits. The basic data unit for memory S2 is $2^{p2}=2^5=32$ bits. The basic data unit for memory S3 is $2^{p3}=2^0=1$ bit.

Figure 5:
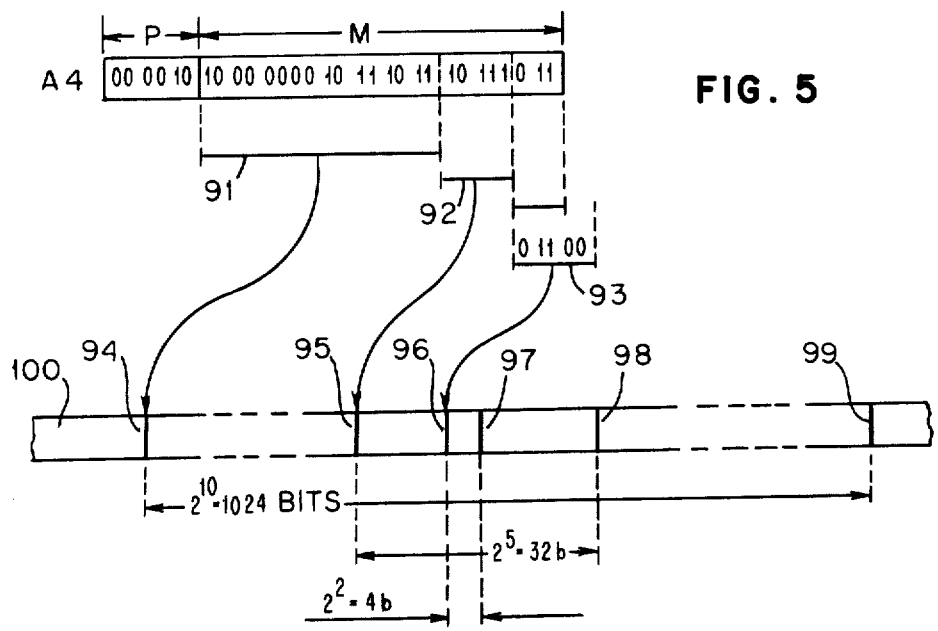
FIG. 5 illustrates the addressing of a memory in the system of FIG. 4.

It is supposed that the user unit 4 is going to fetch four bits from the memory by means of an address word A4. The address word A4 is shown in FIG. 5. When the address A4 is inserted from the adapter unit 3 into the control unit 5 it passes the P modifier circuit 77. The circuit 77 subtracts the p1 value for main memory S1 from the p value of the received address, that is $p=p1=2-10=-8$. The modified value 8 is inserted into the P register 27 of FIG. 3 at the same time as the M part of the address word is put into the register 26. The negative sign of the P modifier causes a signal 81 to the gate 82. The gate 82 changes the output of the H generator 50 from line 84 to line 83. This means that the register 26 will be stepped eight steps downwards at the same time as nothing will be loaded into the register 28.

When shifting the register 26 the eight lowest positions will be loaded over the line 85 into a subregister 86. An address 91 will then be loaded into the address register 61 according to FIG. 5 and only one data word will be read from the memory. According to FIG. 5 where the whole memory is referenced 100 this data word will exist between the boundaries 94 and 99, the length of the data word being 1024 bits. According to FIG. 4 this data word is read from memory S1 via the output 73 to memory S2. Thereafter register 26 is reset, and the eight address bits that are temporarily stored in the subregistor 86 are shifted back to the M register 26.

The control unit 5 then makes access to memory S2 over the connection line 76. This is accomplished in a similar memory access cycle as for memory S1. The modifier circuit 77 subtracts the p2 value from the p value of the address which means $p-p2=2-5=-3$. In the same way as for memory S1 the modified p-value for memory S1 is now set into the p register 27, whereby the gate 82 is activated due to the negative sign. The address in register 26 is now stepped down three units towards register 86, the resulting address 92 according to FIG. 5 then pointing at a position 95 in memory 100. Due to the fact that the register 28 according to FIG. 3 also in this case is prevented from stepping upwards, only one word will be read from the memory S2 over the output 78 to memory S3. This word is shown in FIG. 5 between the borders 95 and 98 and contains 32 bits. Then the register 26 is reset whereafter the three bits from the subregister 86 are shifted back to the M register 26.

The submemory S3 is addressed in the same way as has been earlier indicated for memory S2 and memory S1. The memory S3 has a modifier value of p3=0, which means that the circuit 77 does not modify the p value and that the register 27 stores the p value 2. In this case no signal will influence gate 82, and the circuits of FIG. 3 operate in their normal way. This means that the address of register 26 is stepped two units upwards and that the register 28 will store the value of three. According to FIG. 5, access is had to the memory position 96 by means of the address 93, whereafter four bits are read with the aid of four memory accesses from the field between the memory positions 96 and 97. This four bits are transferred over the line 75 to the control unit 5 and over the output channel 11 to the adapter 3 and further on to the user unit 4.

When bits are to be stored in a memory field of the memory S1 by means of an address word, access takes place in substantially the same way to the memories S1, S2 and S3. Instead of reading the field between positions 96 and 97 of memory S3 in FIG. 5, new bits are stored in this field. The field between the boarder positions 95 and 98 are transferred from memory S3 over the transfer channel 78 to the memory S2 into the position being indicated by the address 92 of FIG. 5. From memory S2 the field between positions 94 and 99 is transferred to memory S2 into the memory position being indicated by the address 91.

It should be noted that the address in the M register 26 must not be deleted in this case but should be intermediately stored for instance into the subregister 86 or into a further register that has not been illustrated.

It is obvious that for an address word A1024 and more only main memory S1 is used. If, on the other hand, the address word is smaller than A1024 but equal to or larger than A32, both memories S1 and S2 will be used. For address words smaller than A32, all three memories S1–S3 are used.

The architecture of the addressing circuits for the various submemories S1–S3 represents no important part of the invention. According to a first alternative the address register 61 is common to all submemories, the control of the address words to its respective memory taking place by means of not illustrated gate circuits.

According to another alternative separate address registers are used for every submemory. For the minor submemories S2 and S3, it is possible to use the information that is shifted from register 26 into register 86 as address information.

According to the embodiment that have been described above, it is seen that effective addresses are generated partly by shifting upwards the M part of the address, which means multiplication, partly by shifting downwards, which means dividing the M part of the address. Further, the parameter values from the P part of the address are subtracted in certain embodiments before said shifting operations. Finally, successive additions or subtractions are executed by a one to and from the generated addresses.

All of the above mentioned arithmetic operations are uniquely defined by the digital value of the P field of the address word, when the parameters of the system have been stated.

Having thus described my invention, what I claim as new and desire to secure by Letters Patent is:

1. A memory system including a memory (2), a memory control unit (5), a memory address register (61) and at least one data register (62), characterized in that the memory control unit includes:

a shift register (26) for receiving an M-bit address part (M) of an N-bit address word on an input address channel (21);

an exponent register (27) for receiving a p-bit exponent part (P) of said N-bit address word, each permutation of said p-bit exponent part representing one of $2^p-1$ digital values;

shifting circuits (25, 41, 50) for shifting the contents of said shift register a number of binary positions equal to the digital value represented by the permutation of said p-bit exponent part in said exponent register to provide a shifted M-bit address part;

transfer means (35, 36, 37) for transferring the M-bit shifted address part from said shift register (26) to the memory address register (61) for addressing the memory (2); and data defining circuits (28, 32, 33, 34) connected, and responsive to, said exponent register (27) and said shifting circuits, for defining a number of successive accesses to the memory, whereby the digital value of the permutation of said p-bit exponent part modifys the M-bit address part to define an initial memory address for a basic data unit (BDU) and the number of BDU's to be accessed.

2. A memory system in accordance with claim 1, wherein said transfer means includes:

a stepping counter connected and responsive to said data defining circuits (35) for stepwise incrementing the M-bit shifted address part in said memory address register in order to obtain successive accesses to the memory.

3. A memory system in accordance with claim 2, wherein said data defining circuits includes:

a pulse generator (34), a step counter (33) connected and responsive to said pulse generator providing a binary permutation count of the number of pulses from said pulse generator, a $2^p-1$ register (28) for storing a number of binary "1" bits equal to the digital value represented by the permutation of said p-bit exponent part, the digital value of the permutation of the binary "1" bits being equal to the number of basic data units to be accessed and a comparator (32) connected to, and comparing the binary permutation in, said $2^p-1$ register and said step counter (33).

4. A memory system in accordance with claim 1, wherein the memory 2 is a hierarchic memory having a number of sub-memories (M1-M256), every submemory Mn representing a lower half part of a following higher submemory M2n, whereby access to a submemory Mn is obtained by said N-bit address word, the exponent part (P) of which has a digital value p such that $2^p=n$.

* * * * *